UNITED STATES PATENT OFFICE.

SAMUEL WILSON KINCAID, OF DELPHOS, KANSAS.

ANODYNE.

SPECIFICATION forming part of Letters Patent No. 371,590, dated October 18, 1887.

Application filed May 19, 1887. Serial No. 238,785. (No specimens.)

*To all whom it may concern:*

Be it known that I, SAMUEL WILSON KINCAID, a citizen of the United States, residing at Delphos, in the county of Ottawa and State of Kansas, have invented a new and useful Improvement in Anodyne Compounds, of which the following is a specification.

My invention relates to an anodyne designed for application to the teeth before extraction, and adapted for use in any case where a local anodyne is needed, and the composition consists of the following ingredients, combined in the proportions stated: I provide a powder composed of potassa permanganate, one one-hundredth of a grain; muriate of cocaine, one fourth of a grain. These ingredient are mixed carefully. I also provide a liquid composed of carbolic acid, ten drops; glycerine, (pure,) one dram; distilled water, one ounce. These ingredients are also mixed carefully.

The said powder and liquid are kept separate until needed, and then one of the powders is dissolved in eight drops of the liquid, the solution is drawn into a hypodermic syringe, the needle of which is inserted into the gum on each side of the tooth successively, and the compound injected in the ordinary manner. After allowing the said compound to remain about five minutes, in order to benumb the nerve and soft tissues, the tooth may be drawn without any pain to the patient.

Not more than three applications should be made at a single sitting.

The anodyne as herein described is very powerful and is adapted to be applied in any case where a local anæsthetic is desired.

What I claim, and desire to secure by Letters Patent of the United States, is—

The herein-described composition of matter for use as a local anodyne, comprising potassa permanganate, muriate of cocaine, carbolic acid, glycerine, and water, in the proportions substantially as specified.

In testimony that I claim the foregoing as my own I have hereto affixed my signature in presence of two witnesses.

SAMUEL WILSON KINCAID.

Witnesses:
C. C. SURBER,
J. W. DILWORTH.